(12) United States Patent
Sandoval et al.

(10) Patent No.: US 11,884,834 B2
(45) Date of Patent: Jan. 30, 2024

(54) DIRT PICK-UP RESISTANT COMPOSITION

(71) Applicant: SWIMC LLC, Cleveland, OH (US)

(72) Inventors: Robert Sandoval, Crystal Lake, IL (US); James Harris, Crystal Lake, IL (US); Mary Jane Hibben, Elburn, IL (US); Andrew Balgeman, Woodstock, IL (US); Christopher Shaffer, Saint Paul, MN (US); Glenn Frazee, Twin Lakes, WI (US); Michael Wildman, Hoffman Estates, IL (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 17/832,167

(22) Filed: Jun. 3, 2022

(65) Prior Publication Data

US 2022/0380621 A1 Dec. 1, 2022

Related U.S. Application Data

(63) Continuation of application No. 16/910,743, filed on Jun. 24, 2020, now Pat. No. 11,377,571, which is a continuation of application No. 16/241,461, filed on Jan. 7, 2019, now Pat. No. 10,723,908, which is a continuation of application No. 15/665,566, filed on Aug. 1, 2017, now Pat. No. 10,196,537, which is a continuation-in-part of application No. 15/295,264, filed on Oct. 17, 2016, now Pat. No. 10,221,322, which is a continuation-in-part of application No. 14/770,123, filed as application No. PCT/US2014/020719 on Mar. 5, 2014, now Pat. No. 9,822,275.

(60) Provisional application No. 61/836,884, filed on Jun. 19, 2013, provisional application No. 61/799,995, filed on Mar. 15, 2013.

(51) Int. Cl.
| | | |
|---|---|---|
| C09D 5/00 | (2006.01) | |
| C08G 61/04 | (2006.01) | |
| C09D 133/06 | (2006.01) | |
| C09D 5/16 | (2006.01) | |
| C08K 5/07 | (2006.01) | |
| C08K 5/10 | (2006.01) | |
| C08K 5/101 | (2006.01) | |
| C09D 7/48 | (2018.01) | |
| C09D 133/14 | (2006.01) | |
| C09D 7/63 | (2018.01) | |
| C08K 5/00 | (2006.01) | |

(52) U.S. Cl.
CPC ............. *C09D 133/06* (2013.01); *C08K 5/07* (2013.01); *C08K 5/10* (2013.01); *C08K 5/101* (2013.01); *C09D 5/00* (2013.01); *C09D 5/1687* (2013.01); *C09D 7/48* (2018.01); *C09D 7/63* (2018.01); *C09D 133/14* (2013.01); *C08K 5/005* (2013.01); *C08L 2201/54* (2013.01)

(58) Field of Classification Search
CPC ........... C08K 5/07; C08K 5/10; C08K 5/101; C08K 5/005; C09D 133/14; C09D 133/06; C09D 7/63; C09D 7/48; C09D 5/00; C09D 5/1687; Y02A 50/20; C08L 2201/54
USPC .............................. 524/284, 81, 80, 1; 520/1
See application file for complete search history.

(56) References Cited

U.S. PATENT DOCUMENTS

| | | |
|---|---|---|
| 3,214,492 A | 10/1965 | Tocker |
| 3,303,046 A | 2/1967 | Paul et al. |
| 3,320,198 A | 5/1967 | Hill |
| 3,429,852 A | 2/1969 | Skoultchi |
| 4,064,286 A | 12/1977 | Hahn |
| 4,071,645 A | 1/1978 | Kahn |
| 4,080,275 A | 3/1978 | Photis et al. |
| 4,252,852 A | 2/1981 | Goth |
| 4,255,308 A | 3/1981 | Brasen |
| 4,314,933 A | 2/1982 | Berner |
| 4,344,876 A | 8/1982 | Berner |
| 4,426,471 A | 1/1984 | Berner |
| 4,654,398 A | 3/1987 | McFadden |
| 4,657,832 A | 4/1987 | Pfeifer |
| 5,106,891 A | 4/1992 | Valet |
| 5,162,415 A | 11/1992 | Rehmer et al. |
| 5,248,805 A | 9/1993 | Boettcher et al. |
| 5,385,815 A | 1/1995 | Schofield et al. |
| 5,609,963 A | 3/1997 | Cai et al. |
| 5,629,365 A | 5/1997 | Razavi |
| 5,705,545 A | 1/1998 | Avar |
| 5,780,117 A | 7/1998 | Swartz |
| 5,824,716 A | 10/1998 | Coqueret et al. |

(Continued)

FOREIGN PATENT DOCUMENTS

| | | |
|---|---|---|
| CA | 2 583 718 A1 | 6/2006 |
| CN | 1288030 A | 3/2001 |

(Continued)

OTHER PUBLICATIONS

Anonymous: "Technical Data Sheet Eastman Texanol (TM) Alcohol Ester", Dec. 1, 2017; 3 pages.

(Continued)

*Primary Examiner* — Jessica Whiteley
(74) *Attorney, Agent, or Firm* — Mueting Raasch Group

(57) ABSTRACT

Water-based compositions that are resistant to dirt pickup, efflorescence, tannin bleed-through and surfactant leaching are described. The water-based composition includes a latex or water-dispersible polymer and a non-VOC UV-VIS (preferably, ultraviolet) absorber as a dirt pickup resistance additive. Methods of making water-based compositions including a non-VOC UV-VIS absorber as an additive are also described.

31 Claims, No Drawings

(56) References Cited

U.S. PATENT DOCUMENTS

| | | | |
|---|---|---|---|
| 5,861,232 A | 1/1999 | Kanda | |
| 5,863,998 A | 1/1999 | Cai | |
| 5,942,368 A | 8/1999 | Akiyama et al. | |
| 5,990,228 A | 11/1999 | Eichman et al. | |
| 6,258,887 B1 | 7/2001 | Bardman et al. | |
| 6,303,188 B1 | 10/2001 | Bors et al. | |
| 6,372,340 B1 | 4/2002 | Tominaga et al. | |
| 6,376,570 B1 | 4/2002 | Zhao et al. | |
| 6,488,760 B1 | 12/2002 | Binns et al. | |
| 6,740,692 B2 | 5/2004 | Weitzel et al. | |
| 6,762,230 B2 | 7/2004 | Brandenburger et al. | |
| 6,843,939 B2 | 1/2005 | Stretanski et al. | |
| 6,930,141 B2 | 8/2005 | Gebhart et al. | |
| 7,101,921 B2 | 9/2006 | Edwards et al. | |
| 7,138,438 B2 | 11/2006 | Lauer et al. | |
| 7,659,340 B2 | 2/2010 | Coward et al. | |
| 7,772,318 B2 | 8/2010 | Fasano et al. | |
| 7,812,079 B2 | 10/2010 | Brandenburger et al. | |
| 7,923,503 B2 | 4/2011 | Takahashi et al. | |
| 7,923,513 B2 | 4/2011 | Killilea et al. | |
| 8,106,239 B2 | 1/2012 | Zhou et al. | |
| 8,110,624 B1 | 2/2012 | Brandenburger et al. | |
| 8,378,002 B2 | 2/2013 | Kyota | |
| 8,440,751 B2 | 5/2013 | Kohnke et al. | |
| 8,440,752 B2 | 5/2013 | Brandenburger et al. | |
| 8,507,579 B2 | 8/2013 | Sheerin et al. | |
| 8,530,595 B2 | 9/2013 | Hunt et al. | |
| 8,653,180 B2 | 2/2014 | Koziski et al. | |
| 8,802,765 B2 | 8/2014 | Yang et al. | |
| 9,023,942 B2 | 5/2015 | Van Der Zande-De Maertelaere et al. | |
| 9,120,936 B2 | 9/2015 | Hibben et al. | |
| 9,611,393 B2 | 4/2017 | Hibben et al. | |
| 9,822,275 B2 | 11/2017 | Hibben et al. | |
| 10,196,537 B2* | 2/2019 | Sandoval | C08K 5/10 |
| 10,221,322 B2 | 3/2019 | Sandoval et al. | |
| 10,221,332 B2 | 3/2019 | Nimoto | |
| 10,301,500 B2 | 5/2019 | Hibben et al. | |
| 10,421,868 B2 | 9/2019 | Hibben et al. | |
| 10,723,908 B2* | 7/2020 | Sandoval | C09D 133/14 |
| 10,882,999 B2 | 1/2021 | Hibben et al. | |
| 10,883,012 B2 | 1/2021 | Hibben et al. | |
| 10,889,721 B2 | 1/2021 | Sandoval et al. | |
| 11,312,867 B2 | 4/2022 | Hibben et al. | |
| 11,312,879 B2 | 4/2022 | Hibben et al. | |
| 11,377,571 B2* | 7/2022 | Sandoval | C09D 7/48 |
| 2002/0026006 A1 | 2/2002 | Garcia | |
| 2002/0151648 A1 | 10/2002 | Fasano | |
| 2002/0156163 A1 | 10/2002 | Brandenburger et al. | |
| 2002/0160205 A1 | 10/2002 | Garcia | |
| 2003/0018121 A1 | 1/2003 | Weitzel et al. | |
| 2003/0099831 A1 | 5/2003 | Fewkes et al. | |
| 2004/0131787 A1 | 7/2004 | Fang | |
| 2004/0192684 A1 | 9/2004 | Ravichandran | |
| 2004/0242735 A1 | 12/2004 | McMan et al. | |
| 2005/0009954 A1 | 1/2005 | Gebhard | |
| 2005/0032954 A1 | 2/2005 | Brandenburger et al. | |
| 2005/0203211 A1 | 9/2005 | Gebhard | |
| 2005/0215678 A1 | 9/2005 | Ludtke et al. | |
| 2006/0111503 A1 | 5/2006 | Killilea et al. | |
| 2006/0135684 A1 | 6/2006 | Killilea et al. | |
| 2007/0100074 A1 | 5/2007 | Devonport et al. | |
| 2007/0110981 A1 | 5/2007 | Killilea et al. | |
| 2007/0116866 A1 | 5/2007 | Mich | |
| 2007/0238827 A1 | 10/2007 | Brady et al. | |
| 2007/0248837 A1 | 10/2007 | Hsu et al. | |
| 2007/0259986 A1 | 11/2007 | Elwakil | |
| 2007/0282046 A1 | 12/2007 | Killilea | |
| 2008/0058473 A1* | 3/2008 | Freidzon | C08F 265/04 525/191 |
| 2008/0063965 A1 | 3/2008 | Lai et al. | |
| 2008/0092776 A1 | 4/2008 | Stockl et al. | |
| 2008/0200631 A1 | 8/2008 | Haring | |
| 2009/0035587 A1 | 2/2009 | Killilea et al. | |
| 2009/0149591 A1 | 6/2009 | Yang et al. | |
| 2009/0312469 A1 | 12/2009 | Koziski et al. | |
| 2009/0326121 A1 | 12/2009 | Stockl et al. | |
| 2010/0015360 A1 | 1/2010 | Kyota | |
| 2010/0178494 A1 | 7/2010 | Foster et al. | |
| 2011/0112223 A1 | 5/2011 | Yang et al. | |
| 2011/0245390 A1* | 10/2011 | Yang | C09D 7/63 524/359 |
| 2012/0041092 A1 | 2/2012 | Bohannon | |
| 2012/0053260 A1 | 3/2012 | Balk et al. | |
| 2012/0129974 A1 | 5/2012 | DeNotta et al. | |
| 2013/0116359 A1 | 5/2013 | Bohannon | |
| 2013/0210985 A1 | 8/2013 | Brandenburger et al. | |
| 2014/0256862 A1 | 9/2014 | Palmer et al. | |
| 2014/0275315 A1 | 9/2014 | Hibben et al. | |
| 2014/0275388 A1 | 9/2014 | Rokowski et al. | |
| 2015/0175807 A1 | 6/2015 | Jing | |
| 2015/0275388 A1 | 10/2015 | Yoshida et al. | |
| 2016/0053127 A1 | 2/2016 | Hibben et al. | |
| 2016/0145460 A1 | 5/2016 | Bell et al. | |
| 2017/0029654 A1 | 2/2017 | Hibben et al. | |
| 2017/0073543 A1 | 3/2017 | Joecken et al. | |
| 2017/0096567 A1 | 4/2017 | Brandenburger et al. | |
| 2017/0174904 A1 | 6/2017 | Hibben et al. | |
| 2017/0226373 A1 | 8/2017 | Reno | |
| 2017/0247565 A1 | 8/2017 | Bell et al. | |
| 2017/0327709 A1 | 11/2017 | Sandoval et al. | |
| 2017/0335127 A1 | 11/2017 | Ewert et al. | |
| 2018/0016376 A1 | 1/2018 | Belowich et al. | |
| 2018/0148595 A1 | 5/2018 | Hibben et al. | |
| 2019/0211224 A1 | 7/2019 | Sandoval et al. | |
| 2019/0367740 A1 | 12/2019 | Sandoval et al. | |
| 2019/0367765 A1 | 12/2019 | Hibben et al. | |
| 2020/0190339 A1 | 6/2020 | Hibben et al. | |
| 2020/0377751 A1 | 12/2020 | Sandoval et al. | |
| 2021/0087408 A1 | 3/2021 | Sandoval et al. | |
| 2021/0087409 A1 | 3/2021 | Hibben et al. | |
| 2021/0108102 A1 | 4/2021 | Hibben et al. | |
| 2022/0340775 A1 | 10/2022 | Hibben et al. | |

FOREIGN PATENT DOCUMENTS

| | | |
|---|---|---|
| CN | 1670096 A | 9/2005 |
| CN | 1833008 A | 9/2006 |
| CN | 1847320 A | 10/2006 |
| CN | 101149574 A | 3/2008 |
| CN | 101613514 A | 12/2009 |
| CN | 101952225 A | 1/2011 |
| CN | 102105541 A | 6/2011 |
| CN | 102206394 A | 10/2011 |
| CN | 102304262 | 1/2012 |
| CN | 102307917 A | 1/2012 |
| CN | 103468126 A | 12/2013 |
| CN | 105315819 | 2/2016 |
| EP | 0010000 A1 | 4/1980 |
| EP | 1 574 533 A1 | 9/2005 |
| EP | 1 710 284 A1 | 10/2006 |
| EP | 2133376 A1 | 12/2009 |
| EP | 2371913 A1 | 10/2011 |
| FR | 2786777 A1 | 6/2000 |
| GB | 1189560 | 4/1970 |
| JP | 4117461 A | 4/1992 |
| WO | WO 94/000524 A1 | 1/1994 |
| WO | WO 99/58608 A1 | 11/1999 |
| WO | WO 00/06643 A1 | 2/2000 |
| WO | WO 2002/068547 A1 | 9/2002 |
| WO | WO 2005/097917 A1 | 10/2005 |
| WO | WO 2006/065914 A1 | 6/2006 |
| WO | WO 2007/087458 A1 | 8/2007 |
| WO | WO 2010/008713 A1 | 1/2010 |
| WO | WO 2010/027487 A1 | 3/2010 |
| WO | WO 2011/145024 A2 | 11/2011 |
| WO | WO 2012/028627 A1 | 3/2012 |
| WO | WO 2013/138209 A1 | 9/2013 |
| WO | WO 2014/149756 A1 | 9/2014 |
| WO | WO 2016/053595 A1 | 4/2016 |

(56) References Cited

FOREIGN PATENT DOCUMENTS

| WO | WO 2016/069410 A1 | 5/2016 |
|---|---|---|
| WO | WO 2018/032410 A1 | 2/2018 |
| WO | WO 2019/232051 A1 | 12/2019 |

OTHER PUBLICATIONS

ASTM D2244-02. Standard Practice for Calculation of Color Tolerances and Color Differences from Instrumentally Measured color Coordinates. 1993. 10 pages.
ASTM D2369-90. Standard Test Method for Volatile Content of Coatings. 1990. 5 pages.
ASTM D3960-02. Standard Practice for Determining Volatile Organic Compound (VOC) Content of Paints and Related Coatings. 2002. 8 pages.
ASTM D6886-12. Standard Test Method for Determination of the Individual Volatile Organic Compounds (VOCs) in Air-Dry Coatings by Gas Chromatography. 2012. 7 pages.
Ding, *New Products and Synthetic Technology of Fine Chemicals, 1st Edition*, May 1994, GuangDong Science and Technology Press, pp. 522-523. (In Chinese). With excerpts from First Office Action dated Mar. 16, 2022 and Rejection Decision dated Nov. 16, 2022 for Chinese Patent Application No. 201980036086.4.
EPA, Technical Overview of Volatile Organic Compounds, 2009.
Gachter, et al., editors, *Plastics Additives Handbook, 1st Edition*, 1985, Hauser Publishers, Munich-Vienna-New York, translated into Chinese by Chen, Mar. 1992, China Petrochemical Press, pp. 119-120. (In Chinese). With excerpts from First Office Action dated Mar. 16, 2022 and Rejection Decision dated Nov. 16, 2022 for Chinese Patent Application No. 201980036086.4.
Green, W. Arthur; *Industrial Photoinitiators: A Technical Guide*; CRC Press of the Taylor & Francis Group, © 2010, ISBN 978-1-4398-2745-1, at 87.
"High Lights! Radiation curing with resins and photoinitiators for industrial coatings and graphic arts: Laromer®, Irgacure®, Lucirin®, Darocur®." BASF SE, Lufwigshafen, Germany [retrieved on Aug. 6, 2014]. Retrieved from the Internet:http:--www.basf.com-group-corporate-en_GB-literature>; 44 pages.
International Search Report (and Written Opinion (PCT-ISA-237), dated Jun. 18, 2014, in connection with Patent Application No. PCT-US2014-020719, filed Mar. 5, 2014; 13 pgs.
"Innovative Acrylic Polymers for Architectural Coatings," EPS® Science Simplified—Engineered Polymer Solutions, E-824387-12-BR; Apr. 2023; 8 pgs.
International Search Report and Written Opinion dated Jan. 6, 2016, in connection with Patent Application No. PCT-US2015-049659. 14 pages.
International Preliminary Report on Patentability, dated Sep. 24, 2015, in connection with Patent Application No. PCT-US2014-020719, filed Mar. 5, 2014; 10 pgs.
International Preliminary Report on Patentability, dated Mar. 23, 2017, in connection with Patent Application No. PCT-US2015-049659, filed Sep. 11, 2015; 8pgs.

International Preliminary Report on Patentability for Patent Application No. PCT-US2019-034398, dated Dec. 10, 2020, 8pgs.
International Search Report and Written Opinion for PCT-US2019-034398, dated Sep. 16, 2019.
Koleski et al., "Additives Guide," Paint & Coatings Industry, Apr. 2003, pp. 12-86, www.pcimag.com.
Li, Wenbin, Unknown Title, Jan. 31, 2014, China Central Television University Press, Cover, publication page, pp. 108-110. Translation not provided. See First Office Action for Chinese Patent Application No. 201580048452.X, p. 5 of Summary of Office Action (p. 8 of PDF) and p. 2 of Search Report (p. 12 of PDF) for relevance.
Lin, "Novel Light Stabilizers for Waterborne and Epoxy Coatings," Dec. 31, 2013. Everlight Chemical Industrial Corporation.
Liu, Lijun, Unknown title, Jul. 31, 2012 Heilongjiang University Press, Cover, publication page, pp. 61-62. Translation not provided. See First Office Action for Chinese Patent Application No. 201580048452.X, p. 6 of Summary of Office Action (p. 9 of PDF) and p. 2 of Search Report (p. 12 of PDF) for relevance.
Polymer Properties Database, "Hindered Amine Light Stabilizers (HALS)," https:--polymerdatabase.com-polymer4AI20chemistry!HALS.html. (©2015).
"Product Overview Additives for Architectural Coatings and Construction Chemicals", Jun. 10, 2014 (Jun. 10, 2014), XP055122267, Retrieved from the Internet: <URL:http:--www.basf.com-group-corporate-en-literature-document:-Brand Collacral-Brochure-Product Overview Additives for Architectural Coatings and Construction Chemicals-English.pdf>, [retrieved on Jun. 10, 2014], 6 pages.
Tang, Wanyou, "Post-press processing technology", Oct. 31, 2001, China Light Industry Press, Cover, publication page, p. 60. Translation not provided. See Third Office Action for Chinese Patent Application No. 201580048452.X, p. 1 of Summary of Office Action (p. 4 of PDF) and p. 1 of Search Report (p. 6 of PDF) for relevance.
TCEQ, 2,2,4-trimethyl-1,3-pentanediol monoisobutyrate, Texas Commission on Environmental Quality, 2013.
First Office Action and Search Report for Chinese Patent Application No. 201480014981.3, dated Sep. 5, 2016; 22 pages. English summary provided.
First Office Action and Search Report for Chinese Patent Application No. 201580048452.X, dated Nov. 29, 2019; 12 pages. English summary provided.
Second Office Action and Search Report for Chinese Patent Application No. 201580048452.X, dated Jul. 24, 2020; 21 pages. English summary provided.
Third Office Action and Search Report for Chinese Patent Application No. 201580048452.X, dated Dec. 10, 2020; 17 pages. English summary provided.
European Patent Application No. 15 84 7438.7, filed Mar. 9, 2017; Partial Supplementary European Search Report and Opinion dated Apr. 19, 2018; 11 pages.
First Office Action for Chinese Patent Application No. 201811032221.1, dated Aug. 21, 2020, 15 pages.

* cited by examiner

DIRT PICK-UP RESISTANT COMPOSITION

CROSS-REFERENCE TO RELATED APPLICATION(S)

The present application is a continuation of U.S. patent application Ser. No. 16/910,743, filed 24 Jun. 2020, which is a continuation of U.S. patent application Ser. No. 16/241,461, filed 7 Jan. 2019, which is a continuation of U.S. patent application Ser. No. 15/665,566, filed 1 Aug. 2017, which is a continuation-in-part of U.S. patent application Ser. No. 15/295,264, filed 17 Oct. 2016, which is a continuation-in-part of U.S. patent application Ser. No. 14/770,123, filed 25 Aug. 2015, which is a § 371 national stage entry of PCT Application No. PCT/US2014/020719, filed 5 Mar. 2014, which claims priority to U.S. Provisional Application No. 61/836,884, filed 19 Jun. 2013, and U.S. Provisional Application No. 61/799,995, filed 15 Mar. 2013, each of which is incorporated herein by reference in its entirety.

BACKGROUND OF THE INVENTION

A water-based composition with low volatile organic (VOC) content such as a paint, seal, coat, caulk, etc. is exposed to contamination from the atmosphere from the moment it is applied. This contamination includes dirt and dust which are carried to the surface by rain, airborne moisture droplets, wind currents, or direct physical contact with people, animals, or other objects. Dirt can be either organic or inorganic. Examples of dirt particles include sand, smoke particles, dust, metallic fibers, carbon black, rust, grease, pollen, human detritus, and fungal spores. Dirt particles attract moisture to the surface of the composition. This moisture provides a suitable environment in which microbial spores may survive and proliferate into colonies, thus further contributing to the unsightly appearance of the surface. Accordingly, water-based compositions can acquire a dirty and unsightly appearance because of the amount of dirt that clings to them. Similarly, paints used on exterior masonry walls or wood siding often experience staining and paint loss as a result of efflorescence, tannin bleed-through, surfactant leaching, and other effects.

Previously, the paint industry has used compounds like benzophenone to aid in the dirt pickup resistance of water-based paints, specifically water-based acrylic coatings. However, there is a general desire in the industry to reduce VOC emissions to at or near-zero levels, thereby reducing the environmental and health impact of paints. Benzophenone is considered a VOC and its use as a dirt pickup resistance additive in water-based paints increases the VOC emissions of the paint.

Accordingly, there is a need for effective low VOC compositions that resist dirt pick up and resist efflorescence, surfactant leaching, tannin bleed-through and other similar effects when used as exterior durable paints, and do not compromise the required application and performance properties desirable for finished surfaces in the paint industry.

SUMMARY

The present disclosure provides water-based compositions, such as coating compositions that can resist dirt pick-up and reduce or eliminate surfactant leaching, efflorescence, tannin bleed-through and the like. The compositions contain a latex or water-dispersible polymer and a non-VOC UV absorber, along with methods for making such compositions.

In an aspect, a water-based coating composition is provided, including a latex or water-dispersible polymer having a Tg of about 5 to 20° C. and a non-VOC UV absorber capable of absorbing UV radiation within a range of 240 to 4(0) nm. The composition may optionally include a cross-linking component. The UV absorber is present in an amount sufficient to prevent surfactant leaching, efflorescence, or tannin bleed-through when the coating composition is applied to an exterior substrate surface, as assessed by ΔE values obtained on accelerated testing.

In another aspect, the present disclosure provides methods of making a dirt pickup-resistant composition, including steps of providing one or more ethylenically unsaturated monomers in an emulsion, polymerizing the emulsion, and adding a non-VOC UV absorber to the polymerized emulsion in an amount sufficient to produce a coating composition with improved dirt pickup resistance relative to a conventional coating based on ΔE values.

In yet another aspect, the present disclosure provides a water-based composition consisting essentially of a latex or water-dispersible polymer in water derived by polymerization of an emulsion of one or more ethylenically unsaturated monomers, and a non-VOC UV absorber capable of absorbing UV radiation within a range of 240 to 400 nm. The non-VOC UV absorber is present in an amount sufficient to produce a coating composition with improved dirt pickup resistance relative to a conventional coating composition based on ΔE values.

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as an exclusive list.

The details of one or more embodiments of the invention are set for in the accompanying drawings and the description below. Other features, objects, and advantages of the invention will be apparent from the description and drawings, and from the claims.

SELECTED DEFINITIONS

Unless otherwise specified, the following terms as used herein have the meanings as provided below.

The term "water-dispersible" in the context of the polymer means one that is itself capable of being dispersed in water for creating a dispersion or emulsion of polymer particles in water having at least one month shelf stability at normal storage temperatures.

The term "dispersible" in the context of a dispersible coalescent means that the coalescent can be mixed into the water-based composition of latex or water-dispersible polymer particles to form a uniform mixture without the use of high shear mixing.

The term "stable" in the context of a water-based composition containing a dispersible coalescent means that the coalescent does not phase separate from the water-based composition upon standing at 120° F. (49° C.) for at least four weeks.

As used herein, the terms "volatile organic content" and "VOC" refer to the volatility of the composition as measured by ASTM D6886-14el (Standard Test Method for Determination of the Weight Percent Individual Volatile Organic Compounds in Waterborne Air-Dry Coatings by Gas Chromatography). This test uses methyl palmitate as a reference marker. A compound that elutes prior to the marker is considered VOC while a compound that elutes after the marker is not considered VOC. As used herein, the term "non-VOC" refers to compounds that elute after the methyl palmitate marker, or "exempt" from VOC in that the compounds that elute prior to methyl palmitate but are known to be less volatile than methyl palmitate, such as acetone and t-butyl acetate, for example. The term "exempt" may be used interchangeably with 'non-VOC' when referring to a component of the compositions described herein.

The term "essentially free of VOC" means that the compositions described herein contain less than 5 g/L of VOCs. The terms, "zero VOC" and "essentially free of VOC" are used interchangeably herein.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.)

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkvls, etc. On the other hand, the phrase "alkyl moiety" is limited to the inclusion of only pure open chain saturated hydrocarbon alkyl substituents, such as methyl, ethyl, propyl, t-butyl, and the like.

The term "double bond" is non-limiting and refers to any type of double bond between any suitable atoms (e.g., C, O, N, etc.). The term "ethylenically unsaturated" refers to compounds that include a carbon-carbon double bond (i.e. —C═C—).

As used herein, the term "glass transition temperature" or "Tg" refers to the temperature at which an amorphous, solid material undergoes a reversible transition to a molten, rubber-like state. Unless otherwise indicated, the Tg values described herein are theoretical values predicted using the Fox equation. Application of the Fox equation to estimate the Tg of polymers is well known in the art.

The term "component" refers to any compound that includes a particular feature or structure. Examples of components include compounds, monomers, oligomers, polymers, and organic groups contained there.

Unless otherwise indicated, a reference to a "(meth) acrylate" compound (where "meth" is bracketed) is meant to include both acrylate and methacrylate compounds.

The term "gloss" as used herein refers to the specular reflectance from a planar surface. Gloss is determined by projecting a beam of light of fixed intensity and angle onto a surface and measuring the amount of reflected light at an equal but opposite angle. As used herein, gloss is measured at angles of 200 and 60° using the procedure detailed in ASTM D523-14 (Standard Test Method for Specular Gloss).

The term "efflorescence" as used herein refers to various forms of color change and paint deterioration that occurs with painted masonry, stucco, concrete, stone work, and the like. In certain instances, crusty white salt deposits appear on painted masonry, concrete, stucco, or stone work. The deposits occur because mineral salts present in masonry material, i.e. brick, concrete, and the like, dissolve in water over time and then migrate to the surface of the masonry material and through the paint film as the water evaporates. The term "efflorescence" also refers to color shifts or color loss and deterioration that occurs on fresh (i.e. newly mixed or prepared) masonry, concrete, stucco, or stone work. For example, alkali burnout occurs because the pigments in a water-based paint may lack alkali resistance in the high pH environment of fresh masonry, or the increase in pH of as moisture is introduced.

As used herein, the term "surfactant leaching" refers to a process where a surface painted with a water-based latex paint develops stains or residue on exposure to water over a period of time. This staining is the result of surfactants and other hydrophilic or water-soluble formulation additives in the paint that migrate to the surface of the paint film as the water evaporates over time. The terms "exudation" and/or "weeping" may also be used interchangeably with "surfactant leaching."

The term "tannin bleed-through" as used herein refers to a phenomenon common in painted wood surfaces, particularly exterior wood surfaces such as siding, for example.

Tannins and other extractables or extractive components in wood are soluble in water and tend to migrate or bleed through to the surface of the wood causing discoloration or staining of the paint film applied on the wood surface. The term "extractive bleeding" may be used interchangeably with "tannin bleed-through."

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present disclosure provides water-based compositions, such as coating compositions, particularly paints, containing a latex or a water-dispersible polymer and a water-insoluble UV-VIS (preferably, ultraviolet) absorber. Preferably, the water-based compositions are in the form of paints, although sealers, caulks, and sealants are within the scope of the present disclosure.

The water-based compositions of the present disclosure are advantageous in that they have a relatively low volatile organic (VOC) content without sacrificing the balance of properties desired for an applied (i.e., dry) composition, such as a coating of paint. Governments have established regulations setting forth guidelines relating to volatile organic compounds (VOC) that may be released into the atmosphere. Such regulations vary from region to region, but the most stringent regulations are in the South Coast region (e.g., Los Angeles County and Orange County, Calif.). Such regulations also vary by product. For example, clear topcoats can have no more than 200 grams per liter (g/l), water-borne coatings can have no more than 50 g/l, pigmented lacquers can have no more than 275 g/l VOC.

Reducing the volatility of various paint additives such as, for example, coalescents, solvents, plasticizers, etc. can adversely affect the balance of properties needed in water-based compositions, especially with respect to dirt pick-up.

Thus, there is a need for compositions that possess desirable stability, compatibility, film formation ability, low dirt pick-up, etc.

Compositions of the present disclosure possess these properties while possessing low total VOC in the water-based compositions. In certain embodiments, the water-based compositions include no greater than 25 grams per 100 grams polymer solids, or no greater than 20 grams per 100 grams polymer solids, or no greater than 15 grams per 100 grams polymer solids, or no greater than 10 grams per 100 grams polymer solids, or no greater than 5 grams per 100 grams polymer solids, or no greater than 2 grams per 100 grams polymer solids.

Stated another way, in certain embodiments wherein the water-based compositions of the present disclosure are paints, they include no greater than 25 grams per liter of paint, or no greater than 20 grams per liter of paint, or no greater than 15 grams per liter of paint, or no greater than 10 grams per liter of paint.

In an embodiment, the present description provides methods and compositions that include a non-VOC absorber. Suitable absorbers as described herein include electromagnetic radiation absorbers such as, for example, ultraviolet absorbers, visible absorbers, and the like. These compounds are typically referred to as photoinitiators.

Suitable electromagnetic absorbers are water-insoluble electromagnetic absorbers. By this it is meant that the compounds will not dissolve to an appreciable extent in water at the temperatures typically used for preparing water-based compositions as described herein.

In certain embodiments, suitable UV-VIS absorbers are those compounds capable of absorbing ultraviolet and/or visible radiation within a range of 240-465 nm. For certain embodiments, they are capable of absorbing radiation in the 280-450 nm range. In certain embodiments, suitable visible light absorbers are those compounds capable of absorbing visible radiation within a range of 420 to 450 nm.

In certain embodiments, suitable ultraviolet (UV) absorbers are those compounds capable of absorbing UV radiation within a range of 240 to 400 nm. For certain embodiments, they are capable of absorbing UV radiation in the 280 to 400 nm range, and for certain embodiments in the 315 to 375 nm range.

The UV-VIS (preferably ultraviolet) absorbers do not form a bond to the polymer, although they are capable of generating a radical through a hydrogen-abstracting mechanism by absorbing UV-VIS (typically UV) radiation. Without limiting to theory, it is believed that this results in surface crosslinking of the polymer.

Suitable examples of UV-VIS absorbers include, for example, those described in U.S. Pat. No. 9,120,936.

In an embodiment, the water-based compositions of the present disclosure include one or more UV-VIS (preferably UV) absorbers or photoinitiators. The UV absorber is preferably a non-VOC or zero-VOC compound that elutes after the methyl palmitate marker in ASTM D6886. In a preferred aspect, the water-based compositions described herein preferably includes a single non-VOC UV absorber that elutes after the methyl palmitate marker, such as, for example, methyl-o-benzoyl benzoate (MBB) which has the structure shown below and is a commercially available under the tradename GENOCURE MBB (Rahn USA).

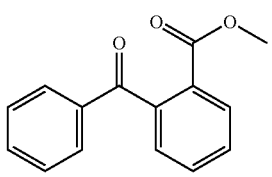 [SMILES: COC(=O)c1ccccc1C(=O)c1ccccc1]

The amount of the UV-VIS (preferably, ultraviolet) absorbers present in the water-based compositions of the present disclosure includes an amount that provides the desired result. In certain embodiments, the water-based composition of the present disclosure includes a sufficient amount of the one or more water-insoluble UV-VIS (preferably, ultraviolet) absorbers to improve dirt pick-up resistance by at least 10%, or at least 20%, or at least 30%, or at least 40%, or at least 50%, relative to the same water-based composition without the UV-VIS (preferably, ultraviolet) absorber, based on a change in ΔE values. The UV-VIS (preferably, ultraviolet) absorber thus acts as a dirt-pick up resistant additive.

A coating discolors when it picks up dirt, or when efflorescence, surfactant leaching, tannin bleed-through and other such effects cause staining of the paint. ΔE is measured by a spectrophotometer by comparing the paint that is exposed to dirt or otherwise stained, and the paint that is "clean" of dirt. The difference is expressed as ΔE. The difference in ΔE's from the "control" paint and the "experimental" paint can then be calculated. The improvement in dirt pick-up resistance or in resistance to efflorescence, surfactant leaching, extractive bleeding, and other effects can be expressed as a percentage by taking the difference in ΔE divided by the ΔE of the "control" paint.

In certain embodiments, the water-based compositions of the present disclosure include at least 0.1 wt % of one or more UV-VIS (preferably, ultraviolet) absorbers, preferably greater than about 0.6%, more preferably greater than about 0.9%, based on the weight of the polymer solids. In certain embodiments, the water-based compositions of the present disclosure include up to 5.0 wt %, preferably 0.6 to 4 wt %, more preferably 0.9 to 2 wt % of one or more UV-VIS (preferably, ultraviolet) absorbers, based on the weight of the polymer solids.

The water-based compositions described herein include a latex or water-dispersible polymer. Such polymers are well known in the paint art and are typically particles emulsified or suspended in an aqueous medium.

Suitable polymers are thermoplastic polymers with a relatively high molecular weight (e.g., 50,000 to greater than 1,000,000 Daltons). The polymers can have a wide range of glass transition temperatures, depending on the desired properties of the resultant coating. For example, suitable polymers include those that have at least one Tg within a range of −20° C. to 70° C., more preferably −20° C. to 60° C., most preferably −10° C. to 40° C.

Without limiting to theory, it is believed that polymers with high Tg (greater than about 20° C.) result in coating compositions or paints with good dirt pickup resistance but poor resistance to tannin bleed-through and surfactant leaching. As a result, when used as exterior paints, these compositions do not demonstrate the desired aesthetic or performance attributes.

Accordingly, in certain embodiments, and particularly when there is a need to reduce or eliminate efflorescence, surfactant leaching, tannin bleed-through and similar effects, suitable polymers include those that have at least one Tg within a range of less than 16° C., preferably less than about 13° C., more preferably less than about 10° C. In certain embodiments, suitable polymers include those that have at least one Tg within a range of about 5° C. to 20° C., more preferably about 8° C. to 14° C.

Conventionally, when polymers with low Tg (less than 20° C.) are used in the coating compositions described herein, the paints demonstrate optimal resistance to tannin bleed-through and surfactant leaching effects, but have poor dirt pickup resistance. Therefore, conventional paint compositions often do not have all the desired performance attributes, especially when used as exterior paints, for example.

Surprisingly, and in contravention of bias and existing knowledge in the industry, the compositions or paints described herein demonstrate an optimal balance of properties. In certain embodiments, compositions or paints as described herein have superior exterior durability (resistance to efflorescence, tannin bleed-through, surfactant leaching and other similar effects) as well as superior dirt pickup resistance.

In an aspect, paints formulated from the coating compositions described herein have superior performance characteristics, including superior dirt pickup resistance, extractive bleeding, and efflorescence characterized by ΔE values of less than about 8.0, preferably less than about 5.0, more preferably less than about 3.0. The paints also have superior resistance to surfactant leaching, characterized by less than about 0.3% extractables measured in the water phase, preferably less than 0.25%, more preferably less than about 0.2%.

In certain embodiments, when the polymer has at least one Tg less than about 10° C., a higher level of non-volatile UV absorber is preferred. Accordingly, in an aspect, water-based compositions of the present disclosure include at least 0.5 wt % of one or more UV-VIS (preferably, ultraviolet) absorbers, preferably greater than about 0.6%, more preferably greater than about 0.9%, based on the weight of the polymer solids in the composition.

A variety of latex polymers may be employed in the disclosed compositions including (meth)acrylics, vinyls, oil-modified polymers, polyesters, polyurethanes, polyamides, chlorinated polyolefins, and mixtures or copolymers thereof. Latex polymers are readily synthesized at modest cost, and are typically prepared through chain-growth polymerization, using one or more ethylenically unsaturated compounds (preferably monomers). Non-limiting examples of olefinic compounds which may be used to prepare latex polymers include ethylene, butadiene, propene, butene, isobutene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide (DAAM), dimethylaminomethacrylate, diethylaminomethacrylate, N-hydroxy (meth)acrylamide, vinyl ether maleate, vinyl esters of VERSATIC acid (VERSATIC acid is a synthetic saturated monocarboxylic acid of highly branched structure containing about 5 to about 10 carbon atoms), and mixtures thereof.

In certain embodiments, the latex polymer particles include a homopolymer or copolymer including at least one of an acrylate or a methacrylate.

In certain embodiments, the water-based latex or water-dispersible polymer described herein is derived from the polymerization of one or more emulsions containing ethylenically unsaturated monomers. Suitable ethylenically unsaturated monomers include, for example, acrylic acid, alkyl and alkoxy acrylates or methacrylates (e.g., methyl methacrylate, butyl acrylate, 2-ethyl hexyl acrylate, butyl methacrylate, and the like), vinyl esters of saturated carboxylic acids, monoolefins, conjugated dienes, optionally with one or more monomers, such as, for example, styrene, vinyl acetate, acrylonitrile, acrylamide, diacetone acrylamide, and vinyl chloride, and the like.

In a preferred aspect, the emulsions described herein may be prepared using one or more monomers having readily abstractable hydrogen atoms. Suitable monomers of this type include, for example, 2-ethyl hexyl acrylate (2-EHA), acetoacetoxy methacrylate (AAEM), and the like. Without limiting to theory, it is believed that these monomers enhance the effectiveness of certain non-VOC UV absorbers, such as MBB for example, as a dirt pickup-resistant additive.

The water-based latex or water-dispersible polymer described herein may be a single stage latex or multistage latex (i.e. those with more than one Tg). In such polymers, generally, there is a hard and a soft phase so the Tg peaks could be −30° to 100° in the same polymer mixture. Frequently, these polymers are referred to as core-shell, but could also be other morphologies like "raspberry-like" or "acorn-like." In an aspect, where the water-dispersible polymer described herein is a multistage latex, the average Tg of the polymer is within a range of preferably −20° C. to 70° C., more preferably −20° C. to 60° C., most preferably −10° C. to 40° C.

Suitable water-based or water-dispersible polymers also include "gradient" polymers in which there is a change in composition (or Tg) during polymerization. Often these types of polymers will not exhibit a sharp inflection point corresponding to a single Tg value when measured by DSC.

In certain embodiments, the water-based latex or water-dispersible polymer described herein is made by a single-stage process using discrete, sequential charges of two or more monomers or monomer mixtures, or was made using a continuously-varied charge of two or more monomers.

In certain embodiments, the water-based latex or water-dispersible polymer described herein is made using a two-stage process. An exemplary two-stage process for making a water-based latex or water-dispersible polymer is described in U.S. Patent Application No. US 2014/0256868 A1.

Exemplary commercially available latex polymers include AIRFLEX EF811 (available from Air Products), EPS 2533, EPS 2757, EPS 2792, EPS 2705 (available from EPS/CCA) and NEOCAR 2300, NEOCAR 820 and NEOCAR 2535 (now Arkema), RHOPLEX VSR 50, RHOPLEX VSR 2015, (available from Dow Chemical Co.), Optive 130 and OPTIVE 230 from BASF. Other exemplary latex polymers include the latex polymers described in U.S. patent application No. US 2007/0110981 A1.

Surfactants suitable for use with latex polymers include, for example, sodium lauryl sulfate, sodium laureth sulfate (DISPONIL series from BASF), sodium dodecyl benzene sulfonate, RHODAFAC RE 610, RHODAFAC RS 410, RHODAFAC RS 610, RHODAFAC RS 710, ABEX EP 100, ABEX EP 110 (Rhodia/Solvay), POLYSTEP B1, POLYSTEP B330 (Stepan, Northfield Ill.), sodium dioctyl sulfosuccinate, and the like.

Suitable water-dispersible polymers include polyurethanes, epoxies, polyamides, chlorinated polyolefins, acrylics, oil-modified polymers, polyesters, and mixtures or copolymers thereof, for example. Such polymers are readily synthesized and made to be water-dispersible using conventional techniques. For example, the incorporation of amine or acid functionality produces water dispersibility.

Oil-modified polymers can also be used if desired. Such polymers are readily synthesized and can be made to be water-dispersible using conventional techniques. As used herein, oil-modified polymers are broadly defined to include polymers that contain oils and/or oil-based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd.

The coating composition described herein is derived by polymerization in a single stage process of an emulsion including one or more ethylenically unsaturated monomers. In a preferred embodiment, the coating composition described herein is made by a method that includes providing one or more ethylenically unsaturated monomers in an emulsion that is polymerized in a single-stage process. In an aspect, the emulsion includes about 20 to 60, preferably 30 to 55 percent by weight of methyl methacrylate; 0 to 40, preferably 10 to 30 percent by weight of 2-ethyl hexyl acrylate; 10 to 60, preferably 15 to 55 percent by weight of butyl acrylate; about 0 to 30, preferably 10 to 20 percent by weight of butyl methacrylate; and about 0 to 10, preferably 1 to 5 percent by weight of methacrylic acid.

In certain embodiments, the coating composition described herein optionally includes a crosslinking component. Suitable crosslinking components are selected from one or more ethylenically unsaturated monomers including, for example, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, glycidyl methacrylate, 4-hydroxybutyl acrylate glycidyl ether, 2-(acetoacetoxy)ethyl methacrylate (AAEM), diacetone acrylamide (DAAM), acrylamide, methacrylamide, methylol (meth) acrylamide, styrene, α-methyl styrene, vinyl toluene, vinyl acetate, vinyl propionate, allyl methacrylate, and mixtures thereof. Preferred monomers for use as the crosslinking component include AAEM, DAAM, and mixtures or combinations thereof.

In certain embodiments, if a crosslinking component is used, the coating composition described herein includes about 0 to 10, preferably 1 to 5 percent by weight of the crosslinking component. In a preferred aspect, the crosslinking component includes AAEM, DAAM, and mixtures or combinations thereof.

The amount of latex or water-dispersible polymers present in the coating compositions described herein includes an amount that provides the desired result. Preferably, one or more polymers is used in an amount of at least 10 wt %, based on 10 to 25% solids of the paint for flats and 15 to 35% for semi-gloss paints. Preferably, one or more polymers are present in an amount of up to 25 wt %, based on solids.

Other components of the coating compositions descried herein include those typically used in paint formulations, such as coalescents, pigments (in a pigment grind), fillers, thickeners, biocides, mildewcides, surfactants, dispersants, defoamers, and the like. The coating compositions can be made using standard techniques known in the paint industry. Typical pigment volume concentrations (PVC) ranges for flat paints are 35 to 75 for semi-gloss are 20 to 40, while a high gloss paint has PVC ranges of about 10 to 25.

In an embodiment, the coating compositions described herein may be used to make semi-gloss and high gloss paint formulations. By "semi-gloss" is meant a paint finish that has a moderately satin-like luster and has a 60° gloss rating of at least about 30, more preferably about 35 to 70 units. A "high gloss" paint finish has a shiny appearance and reflects light in a specular or mirror-like direction. High gloss paints have 60° gloss ratings of at least about 70, more preferably 70 to 85, and even more preferably, greater than 85 units.

Preferably, the coating compositions described herein include one or more coalescent compounds having a relatively low volatile organic content (VOC), and more preferably, a low molecular weight. Typically, the volatile organic content of suitable coalescents, as determined by ASTM D2369-90, is 30% or less, 20% or less, 15% or less, 11% or less, or 10% or less, based on the original weight of the coalescent.

Examples of suitable low VOC coalescents for use in the coating compositions described herein include one or more compounds as described in U.S. Pat. No. 8,440,752. Specific examples include, for example: tergitols (e.g., that are available under the trade name TERGITOL, such as TERGITOL 15-S-15 from Dow), alkyl phthalate esters (e.g., dimethyl phthalate, diethyl phthalate, dibutyl phthalate, dioctyl phthalate, di-2-ethylhexyl phthalate, heptyl nonyl undecyl phthalate, butyl cyclohexyl phthalate, and dicyclohexyl phthalate); aryl phthalate esters (e.g., diphenyl phthalate); alkyl aryl phthalate esters (e.g., butyl benzyl phthalate); alkyl citrate esters (e.g., tributyl citrate and triethyl citrate); isosorbide di-alkyl ethers (e.g., dimethyl and diethyl isosorbide ether); alkyl maleates (e.g., dioctyl maleate and bis(2-ethylhexyl) maleate); alkyl adipate esters (e.g., bis(2-ethylhexyl) adipate and dioctyl adipate); alkyl aryl adipate esters (e.g., benzyl octyl adipate); benzoate esters (e.g., diethylene glycol dibenzoate, isodecyl benzoate, oxtyl benzoate); azelates (e.g., bis(2-ethylhexyl)azelate); ricinoleic acid esters; polyethylene glycol ethers; tri(ethylene glycol)bis(2-ethylhexanoate); tetra(ethylene glycol)bis(2-ethylhexanoate); glyceryl monooleate; octadecenoic acid methyl ester, and oleic acid monoester of propylene glycol; and fatty acid/oil derivatives such as those available from ADM under the trade designation ARCHER PC.

Examples of preferred low VOC coalescents include bis(2-ethylhexyl) maleate, bis(2-ethylhexyl) adipate, bis(2-ethylhexyl) azelate, isodecyl benzoate, tri(ethylene glycol) bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid monoester of propylene glycol.

These compounds can be formed using standard organic synthesis techniques, which are well known to one of skill in the art.

The amount of the one or more low VOC coalescents present in the water-based compositions of the present disclosure includes an amount that provides the desired result. Preferably, one or more relatively low VOC coalescents, are present in a water-based composition in an amount of at least 1 wt-%, or at least 2 wt-%, or at least 3 wt-%, or at least 4 wt-%, or at least 5 wt-%, based on polymer solids. Preferably, one or more relatively low VOC coalescents are present in a water-based composition in an amount of up to 10 wt-%, or up to 20 wt-%, based on polymer solids. When mixtures of such coalescents are used, the numerical values of the variables in the formulas described herein are averages.

The types of additives that can be incorporated into a water-based composition of the present disclosure depend on the use of the composition. For example, a paint includes one or more pigments (referred to as a pigment grind). A sealer may typically include a defoamer and possibly a surfactant. A caulk or sealant includes similar additives to that of a paint.

In certain embodiments, a paint contains sufficient $TiO_2$ pigment to be substantially visually opaque when applied at a thickness of 3 mil (0.0762 mm) and dried.

The UV-VIS (preferably, ultraviolet) absorber(s) can be incorporated into the compositions described herein using a variety of methods known to those of skill in the art. An example of a suitable method includes mixing or dissolving the absorber into one or more low VOC coalescents prior to adding the mixture or solution to a pigment grind component, or a polymer/pigment mixture. Another suitable example includes mixing or dissolving the absorber into one or more low VOC coalescents that are subsequently added to a finished paint formulation.

In a preferred aspect, the UV-VIS (preferably, ultraviolet) absorber described herein is added to a polymer emulsion mixture after polymerization is complete. For a single-stage system, a monomer emulsion including two or more monomers is fed to a reactor over a specified period of time, and the UV-VIS absorber is added after polymerization is complete. For a two-stage system, a first monomer feed including two or more monomers is fed to a reactive over a specified period of time, following by a second monomer feed that includes two or more monomers. The first and second monomer feeds may include the same or different monomers, and these monomers may be present in the same or different amounts in the first and second monomer feeds. The average Tg of the two stages is preferably between −10 and 40° C. The UV-VIS absorber is then added to the two-stage system after polymerization is complete.

Accordingly, in an embodiment, the coating composition described herein is made by a method that includes: providing a water-dispersible polymer in an aqueous solvent; providing a non-VOC UV absorber capable of absorbing UV radiation within a range of 240 to 400 nm; and mixing the water-dispersible polymer with the UV absorber in an amount sufficient to produce a coating composition with improved dirt pick-up resistance relative to a conventional coating composition, based on ΔE values.

In an embodiment, the coating composition described herein is made by a method that includes: providing one or more ethylenically unsaturated monomers in an emulsion; polymerizing the emulsion; and adding a non-VOC UV absorber capable of absorbing UV radiation in a range of about 240 to 400 nm to the polymerized emulsion. In this method, the non-VOC UV absorber is present in an amount sufficient to produce a coating composition with improved dirt pick-up resistance relative to a conventional coating composition, based on ΔE values.

In another embodiment, the coating composition described herein is made by a method that includes providing one or more ethylenically unsaturated monomers in a first monomer emulsion and a second monomer emulsion that are polymerized in a two-stage process. In an aspect, the first monomer emulsion includes about 10 to 30 percent by weight of butyl acrylate; 1 to 4 percent by weight acetoacetoxy ethyl methacrylate; 50 to 90 percent by weight of methyl methacrylate; and 1 to 5 percent by weight of (meth)acrylic acid. The second monomer emulsion includes about 1 to 5 percent by weight of acrylic acid; 1 to 10 percent by weight of diacetone acrylamide; 1 to 10 percent by weight of butyl acrylate; and 75 to 90 percent by weight methyl methacrylate.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were utilized in the Examples that follow.
A. Dirt Pickup Resistance Test Paint samples to be tested are applied to a 3×6 aluminum Q panel (or other appropriate substrate) using a wire wound drawdown bar (RDS) to a film thickness of about 3 mils. Each paint sample is then dried for 24 hours at room temperature (70-75° F.). Dried panels are placed outdoors or in a QUVA cabinet for one week, with some exposure to sunlight. Outdoor testing is preferred, but QUVA exposure is acceptable.

The panels are then returned to the lab after one week exposure and blotted dry if necessary.

A "dirt" slurry is prepared as follows. First, 50 grams (g) red iron oxide (R4097), 40 g yellow oxide pigment, and 10 g black iron oxide pigment are combined and hand stirred or shaken until homogenous. Then 0.5 g TAMOL 731 (Dow Chemical) is added to 200 g deionized water with agitation. The pigment combination is then slowly added and mixed for 30 minutes until a smooth slurry is formed.

The slurry is applied to half of the coated panels using a foam applicator or other suitable brush, and dried on panels at room temperature for 3-4 hours.

The dried slurry is then washed off each panel by running the panel under water and using a small piece of cheese cloth, rubbing lightly. A clean cloth is used for each panel. The panels are blotted dry and allowed to completely dry (2-4 hours) before measuring change in color, ΔE, using a spectrophotometer.
B. Measurement of Gloss Specular gloss ratings for paint formulations applied to test panels are measured according to the procedure described in ASTM D523-14 (Standard Method for Specular Gloss).
C. Measurement of Surfactant Leaching To determine surfactant leaching, a paint is drawn down onto a black mylar chart using a 6 mil drawdown bar. The drawdown is dried for 4 hours at room temperature. 5 g of water is pipetted onto the drawdown, keeping care to apply the water in as small of a surface area as the coating allows. The water is allowed to sit for 30 minutes, after which, the water is collected and analyzed for extractables using Liquid Chromatography-Mass Spectroscopy (LC-MS).

D. Measurement of Efflorescence

In order to perform efflorescence testing, the white paint was tinted in a half-pint sized-can with two colorants. 248.6 grams of white paint was tinted with 24 grams of Novocolor 8544C Quinacridone Red, and 14 grams of Novocolor 8513 Yellow colorant. The tinted paints were then shaken for approximately 5 minutes. Before painting, each tinted paint was drawn down on a plain white penopac chart, using a 3 mil draw down bar, and stored in a drawer to preserve the color. The substrates used for efflorescence testing were Hardie Boards skim-coated with UGL Drylok. Once dried, the board was split off into 6 equal length sections. These sections were painted with 400 square feet per gallon amount of paint, which equated to 6 grams. After completing the first coats of each section, the board was left to dry approximately 2 hours before finishing with a second coat on each section. They were then allowed to dry at room temperature overnight and then put outside for exterior exposure the following day. The panels were exposed outside for 24 days. The panels were then brought inside and measured on a spectrophotometer, measuring a ΔE value of the current color after being exposed, compared to its initial color, on the draw down chart taken initially.
E. Measurement of Tannin Stain Blocking To evaluate the tannin stain blocking, a redwood board is painted with two coats (4 hours in between coats) of white paint. The board is allowed to dry for 1 to 2 days, after which the board is placed into a humidity cabinet for 3 days. After removal from the cabinet, the board is allowed to dry overnight and ΔE values are measured to evaluate color change.

Example 1. Preparation of Paint Compositions

Single stage latex polymer compositions were prepared by combining monomers including methacrylic acid (MAA), methyl methacrylate (MMA), n-butyl methacrylate (BMA) and/or 2-ethyl hexyl acrylate (EHA) in the amounts shown in Table 1. Emulsions #1 and #2 in Table 1 were prepared according to standard methods known to those of skill in the art. The emulsions were fed into a reactor over a three-hour time period. After polymerization was complete, a non-VOC UV absorber or photoinitiator was added to each emulsion. A white paint formulation and a clear paint formulation were prepared from the emulsions and tested for dirt pick up resistance, efflorescence, tannin bleed-through (white) and surfactant leaching (clear). The Tg values for each emulsion were measured by differential scanning calorimetry (DSC).

TABLE 1

| Polymer Compositions | | | | | |
|---|---|---|---|---|---|
| Emulsion | MAA (%) | MMA (%) | BA (%) | EHA (%) | Measured Midoint Tg (° C.) |
| 1 | 1.5 | 44 | 40.3 | 10 | 14.2 |
| 2 | 1.5 | 44 | 30.7 | 20 | 11.7 |

Example 2. Performance Testing

Test paint formulations A and B were made from emulsions #1 and #2 from Example 1 and applied to 3×6 aluminum Q panels. The dirt pick up resistance, efflorescence and tannin bleed-through of each formulation was evaluated according to procedures described above. Four test panels were prepared and results were averaged. Surfactant leaching was assessed by measuring the amount of extractables in the water phase, specifically polyethylene glycol (PEG 400) using LC-MS. For comparison, paint formulations C and D were prepared using two commercially available all-acrylic latex polymers, Acronal OPTIVE 230 (BASF) and RHOPLEX 585 (Dow) and evaluated for the same performance characteristics.

Results are reported in Table 2. Surfactant leaching is reported as a percent of extractables and dirt pickup resistance is reported as a change in color or ΔE reading from a spectrophotometer.

TABLE 2

Performance Testing

| Paint | Dirt Pick Up Resistance (ΔE) | PEG (%) | Efflorescence (ΔE) | Tannin (ΔE) |
|---|---|---|---|---|
| A | 3.67 | 0.22 | 2.57 | 3.67 |
| B | 4.62 | 0.20 | 2.07 | 3.75 |
| C | 15.89 | 0.36 | 4.19 | 9.96 |
| D | 8.72 | 0.36 | 3.32 | — |

Example 3. Preparation of a Two-Stage Polymer Composition

A two-stage latex polymer was prepared by making a first monomer emulsion including 11.5 g acrylic acid, 6.5 g methacrylic acid, 30 g diacetone acrylamide, 400 g butyl methacrylate, and 120 g methyl methacrylate. This first monomer emulsion was fed into a reactor over a two-hour time period. A second monomer emulsion including 7.6 g acrylic acid, 14 g butyl acrylate, 13 g diacetone acrylamide, and 210 g methyl methacrylate was then fed into the reactor over a one-hour time period. After polymerization was complete, a non-VOC UV absorber or photoinitiator was added to the emulsion. A paint formulation was prepared from the emulsion.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A water-based composition, comprising:
   a latex polymer having a Tg of about 5° C. to 20° C.; and
   methyl-o-benzoyl benzoate;
   wherein methyl-o-benzoyl benzoate is present in an amount of at least 0.1 wt-% and up to 5.0 wt-%, based on the weight of the polymer solids;
   wherein the composition includes no greater than 20 grams of total VOC per 100 grams polymer solids; and
   wherein the water-based composition includes a near-zero level of benzophenone.

2. The composition of claim 1, wherein the composition improves dirt pick-up resistance by at least 10%, relative to the same water-based composition without the methyl-o-benzoyl benzoate, based on a change in ΔE value.

3. The composition of claim wherein the composition improves dirt pick-up resistance by at least 50%, relative to the same water-based composition without the methyl-o-benzoyl benzoate, based on a change in ΔE value.

4. The composition of claim 1 wherein the composition includes no greater than 10 grams of total VOC per 100 grams polymer solids.

5. The composition of claim 1, wherein the latex polymer has a Tg of about 8° C. to 14° C.

6. The composition of claim 1, wherein methyl-o-benzoyl benzoate is present in an amount of at least about 0.6 weight percent and up to 5.0 weight percent, based on the total weight of polymer solids in the composition.

7. The composition of claim 6, wherein methyl-o-benzoyl benzoate is present in an amount of at least about 0.9 weight percent and up to 5.0 weight percent, based on the total weight of polymer solids in the composition.

8. The composition of claim 1 further comprising a crosslinking component.

9. The composition of claim 8, wherein the crosslinking component comprises 2-(acetoacetoxy)ethyl methacrylate (AAEM), diacetone acrylamide (DAAM), or mixtures or combinations thereof.

10. The composition of claim 9, wherein the crosslinking component comprises 2-(acetoacetoxy)ethyl methacrylate (AAEM).

11. The composition of claim 10, wherein the crosslinking component comprises diacetone acrylamide (DAAM).

12. The composition of claim 1, wherein the latex polymer is derived from one or more ethylenically unsaturated monomers.

13. The composition of claim 12, wherein the latex polymer is derived by polymerization in a single stage of an emulsion of one or more ethylenically unsaturated monomers comprising alkyl acrylates, alkoxy acrylates, alkyl methacrylates, alkoxy methacrylates, vinyl esters of saturated carboxylic acids, mono olefins, conjugated dienes, styrene, vinyl chloride, or combinations thereof.

14. The composition of claim 12, wherein the latex polymer is derived by polymerization in a single stage emulsion process, the emulsion comprising:
   about 30 to 55 wt percent methyl methacrylate;
   about 0 to 40 wt percent 2-ethyl hexyl acrylate;
   about 15 to 55 wt percent butyl acrylate
   about 0 to 30 wt percent butyl methacrylate; and
   about 1 to 5 wt percent methacrylic acid.

15. The composition of claim 1, wherein the composition is a water-based paint, sealer, caulk, or sealant.

16. The composition of claim 15, wherein the composition is a water-based durable paint for exterior use.

17. The composition of claim 1, wherein the composition is a water-based durable paint with a pigment volume concentration of at least 40%.

18. The composition of claim 1, wherein the composition has extractables of less than about 0.3%.

19. The water-based composition of claim 1, wherein the latex polymer is a multistage latex polymer.

20. A water-based composition, comprising:
   a latex polymer having a Tg of about SoC to 20° C.;
   methyl-o-benzoyl benzoate; and
   2-(acetoacetoxy)ethyl methacrylate (AAEM), diacetone acrylamide (DAAM), or a mixture or combination thereof;

wherein methyl-o-benzoyl benzoate is present in an amount of at least 0.1 wt-% and up to 5.0 wt-%, based on the weight of the polymer solids;

wherein the composition includes no greater than 20 grams of total VOC per 100 grams polymer solids; and wherein the water-based composition includes a near-zero level of benzophenone.

21. The composition of claim 20, wherein the composition includes a sufficient amount of methyl-o-benzoyl benzoate to improve dirt pick-up resistance by at least 10%, relative to the same water-based composition without the methyl-o-benzoyl benzoate, based on a change in ΔE value.

22. The composition of claim 21, wherein the composition includes a sufficient amount of methyl-o-benzoyl benzoate to improve dirt pick-up resistance by at least 50%, relative to the same water-based composition without the methyl-o-benzoyl benzoate, based on a change in ΔE value.

23. The composition of claim 20, wherein the composition is suitable for use as an exterior paint.

24. The composition of claim 20, wherein the composition is suitable for use on masonry, concrete, stucco, or stone work.

25. A water-based composition, comprising:

a latex polymer having a Tg of about 5° C. to 20° C.; and methyl-o-benzoyl benzoate;

wherein methyl-o-benzoyl benzoate is present in an amount of at least 0.1 wt-% and up to 5.0 wt-%, based on the weight of the polymer solids;

wherein the composition includes no greater than 50 grams of total VOC per 100 grams polymer solids; and wherein the water-based composition includes a zero level of benzophenone.

26. The composition of claim 25, wherein the composition includes a sufficient amount of methyl-o-benzoyl benzoate to improve dirt pick-up resistance by at least 10%, relative to the same water-based composition without the methyl-o-benzoyl benzoate, based on a change in ΔE value.

27. The composition of claim 26, wherein the composition includes a sufficient amount of methyl-o-benzoyl benzoate to improve dirt pick-up resistance by at least 50%, relative to the same water-based composition without the methyl-o-benzoyl benzoate, based on a change in ΔE value.

28. The composition of claim 25, wherein the composition is suitable for use as an exterior paint.

29. The composition of claim 25, wherein the composition is suitable for use on masonry, concrete, stucco, or stone work.

30. The composition of claim 1, wherein the composition is suitable for use as an exterior paint.

31. The composition of claim 1, wherein the composition is suitable for use on masonry, concrete, stucco, or stone work.

* * * * *